Dec. 7, 1937. J. N. MARTIN Re. 20,574

PUMP PLUNGER

Original Filed May 4, 1937

INVENTOR.
JOHN N. MARTIN
BY Barry + Cyr
ATTORNEYS.

Reissued Dec. 7, 1937

Re. 20,574

UNITED STATES PATENT OFFICE 20,574

PUMP PLUNGER

John N. Martin, Tulsa, Okla.

Original No. 2,095,708, dated October 12, 1937, Serial No. 140,703, May 4, 1937. Application for reissue October 19, 1937, Serial No. 169,920

3 Claims. (Cl. 309—23)

My invention relates to pump plungers and particularly to plungers for use in deep well pumping against relatively high fluid heads.

In plungers of this type which have heretofore been used, composition packing rings are assembled in groups on a body or piston, each ring being separated from the next by a loose washer or spacer and the group held in place by an end nut. The failure or breaking down of any one ring removes the support for the adjoining ring so that it is no longer held to a proper pressure against the bore of the working barrel or cylinder. Another disadvantage common to these plungers is that the pressure of the fluid pumped against compresses the whole group of rings and spacers downward on the body in the ordinary working barrel installation, (or upward on an inverted insert pump), so that the end ring is highly compressed and worn out in a relatively short time. This sets a practical limit on the pressure against which this type of plunger will work, or the depth of the well which can be pumped by this means. Actual experience shows that after the failure of one ring, usually the bottom ring of each group on a travelling valve working in the ordinary working barrel, the other rings are quickly torn up.

For use in pumping wells where the pressure is beyond the practical limit for composition packed plungers, pumps having all-metal plungers which fit very closely within the cylinder are used. There are two main objections to this type of pump. One is the deleterious effect upon the efficiency of the pump resulting from abrasion of the plunger and cylinder surfaces due to sand particles which are usually present in the well fluids, and second, the relatively high cost of such pumps.

Therefore, one object of this invention is to provide a plunger, having composition packing rings, for pumping against pressures hitherto beyond the practical limits of such packing and to thereby provide a relatively low cost pump for deep well pumping.

A particular object of this invention is to provide a plunger body which is grooved to receive composition packing rings, either singly or in multiple, so that each ring or multiple ring is firmly held in place without the use of removable spacers or compression nuts, and entirely independently of the adjoining rings.

Another object is to arrange the packing rings on the plunger body so that each ring offers its resistance to the slippage of fluid independently of any other ring.

A further object is to obtain greater wearing life from a group of packing rings by an arrangement whereby the failure of any one ring will place no handicap upon the other rings except to transfer its percentage of pressure resistance upon them.

Still another object is to provide a plunger which will pump against any desired pressure or at any depth in a well.

An additional object is to eliminate the necessity of any adjustments, such as are required on present types of plungers, of the composition packed type, by utilizing composition packing rings which swell in the presence of the fluid to be pumped and which have swelling characteristics pre-determined for each type of fluid to be pumped.

Other objects and advantages of my new invention will be evident from the following detailed description when read in conjunction with the accompanying drawing which illustrates one form of my new invention.

Figure 2:
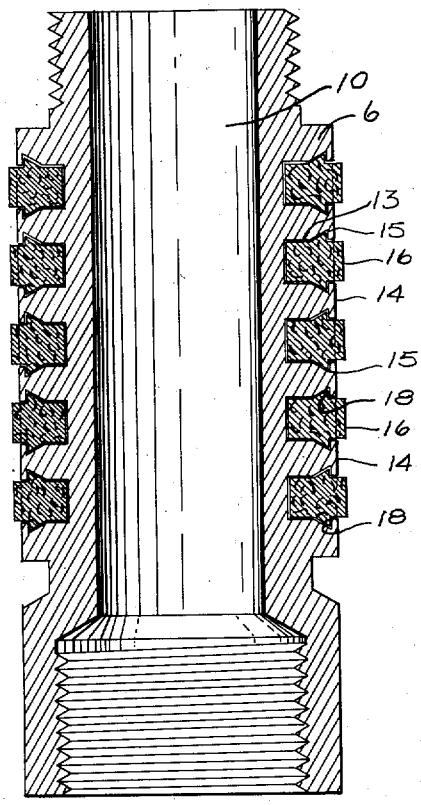
Fig. 2 is a sectional elevation of a plunger in accordance with this invention showing same removed from the working barrel.

Referring to the drawing, numeral 5 designates a conventional working barrel, in which is mounted a cylindrical plunger body 6, the outside diameter of which is slightly smaller than the bore 5*a* of barrel 5, thereby allowing plunger body 6 to slide freely within the bore 5*a*. The upper end of the body 6 is connected by threaded attachment to a conventional travelling valve cage 7 which is in turn connected to the lower end of a pump rod 8 by means of a collar 9. Body 6 has an axial bore 10 extending therethrough to permit passage of fluids through the body. A conventional ball valve 11 cooperates with an annular seat 12 which is mounted within cage 7, the valve 11 and seat 12 cooperating to open or close bore 10 in accordance with the reciprocation of body 6.

Body 6 is provided with a series of spaced circumferential grooves 13 which are substantially rectangular in cross-section and which are cut into the metal forming the walls of body 6. Grooves 13 are preferably spaced equidistant from each other along body 6. The cutting of grooves 13 at spaced distances into the metal of body 6 provides intervening metal lands 14, which are also substantially rectangular in cross section and which are circular in transverse section, the diameter of the latter section being the same as that of body 6 from which the lands 14 are formed. Each face of lands 14 which form the sides of grooves 13, has an annular recess 15 cut therein which is of angular shape. The face of the recess 15 farthest removed from the axis of body 6 being substantially parallel to this axis and the opposite face sloping from the bottom of the recess in the direction of the adjacent groove.

Figure 3:
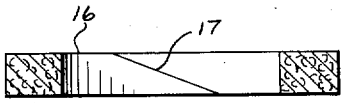
Fig. 3 is a transverse sectional view of one of the composition packing rings before swelling has occurred.
Figure 4:
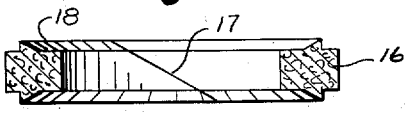
Fig. 4 is a similar view of the ring after swelling to its normal working form.
Figure 1:
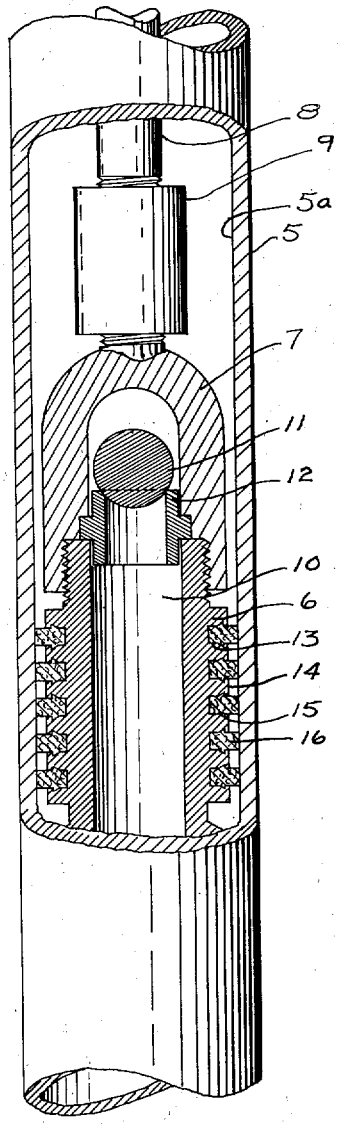
Fig. 1 is an elevation of a portion of a conventional working barrel from which a part of the wall has been broken away showing a sectional elevation of a plunger in accordance with the invention.

Each of grooves 13 is fitted with a packing ring 16 whose normal cross sectional area is only very slightly smaller than that of grooves 13 and is of corresponding shape so as to fit closely therein. Rings 16 are of split construction having a bias split 17 (Figs. 3 and 4) to permit mounting of the rings in grooves 13.

Packing rings 16 are made of composition material which is adapted to swell in the presence of the fluid to be pumped and when pumping such fluid will swell sufficiently to protrude into recesses 15 and outwardly from grooves 13 toward bore 5a of barrel 5, and will thereby press against bore 5a to prevent slippage of fluid past the rings. In their unswelled condition, rings 16 are preferably flush or substantially so with the outer surface of body 6, as shown by the dotted lines in Fig. 2, whereby permitting the ready insertion of body 6 and rings 16 into bore 5a.

When pumping fluids such as oil or a mixture of oil and water, packing rings 16 are preferably formed of such composition material as is used in rubber belting, that is, rubber and fabric composition which will swell in the presence of such fluid. When pumping water, other material which have the characteristic of swelling in the presence of water, or belting composition may also be used for this service by first assembling under-sized rings on body 6 and causing them to swell a pre-determined amount by immersion in oil and after the rings have swelled to the desired size, the plunger may be utilized for pumping water.

By providing packing rings which normally, that is before swelling, completely fill grooves 13, such rings when in contact with fluids producing swelling thereof, can swell only into recesses 15 and outwardly beyond the outer edges of grooves 13 toward bore 5a. The protrusion of the material of rings 16 into recesses 15 forms annular ridges 18 on the sides of the rings adjacent to lands 14 and ridges 18 will assume a shape corresponding to the outline of recesses 15 and will serve to anchor rings 16 in grooves 13 against displacement by friction of the rings against the bore 5a. Since the extent of the swelling of the packing rings is limited by the sides of grooves 13, the major portion of such swelling will be in the direction of bore 5a and the degree of such swelling can be pre-determined for each packing material in relation to the fluid to be pumped so that a good pumping fit between the packing rings and bore 5a will always be provided. At the same time swelling of the packing rings will conform in shape to the interior of grooves 13 and will also cause the rings to tightly fill grooves 13 and thus prevent leakage of fluid between the rings and the walls of the grooves, the protrusion of rings 16 into recesses 15 assisting in this respect.

Ordinarily the clearance provided between body 6 and bore 5a will be from about one sixty-fourth inch to about one thirty-second inch, and packing rings 16 will be so cut, in accordance with their pre-determined swelling characteristics, that they will swell sufficiently only to bridge the clearance space between body 6 and bore 5a and provide a close sliding fit in bore 5a.

By the above described arrangement, each packing ring 16 will be fully supported within body 6 by lands 14 entirely independently of every other ring and the pumping load will be divided between the several rings. Thus, even though one of the individual rings 16 may fail, the efficiency of the entire group of rings will be relatively unaffected except that the remaining rings will have distributed on them that portion of the pumping load which was previously carried by the ring that had failed.

The end tightening nuts, such as are at present used, will be eliminated by my arrangement, which instead will utilize independent packing rings which are self-tightening.

The plunger of my invention, arranged as above described, will pump against any desired pressure by providing a suitable number of packing rings, and will have all of the advantages of a composition packed plunger in combating sand abrasion and in conforming itself to any irregularities in the surface of the bore of the working barrel, while at the same time providing a plunger which is considerably lower in cost than metal packed or all-metal pumps.

By provision of a body 6 which is relatively close fitting within barrel 5 and which is fitted with composition packing rings of pre-determined swelling characteristics which permit the packing to swell sufficiently only to form a good pumping fit in bore 5a, only a very small area of each packing ring will remain unsupported by lands 14 and as a result, the rings will offer very effective resistance to the fluid pressure against which the rings must move. Consequently, very little flexing of the rings will occur under pressure thus permitting the rings to retain their maximum sealing efficiency for relatively long periods of time. In order to further reduce any flexing tendency of the portion of the rings which is exposed to the pressure of the fluid, that is, the unsupported portion of the rings, the cross section of the grooves 13, and consequently of rings 16 is preferably made to approach a square. For example, groove 13 may be in the form of a rectangle in cross section, the horizontal sides of which are about five sixteenths inch in length and the adjacent sides about one quarter inch in length. Rings 16 will normally have approximately the same dimensions in cross section and after swelling may increase in length horizontally to about eleven thirty-seconds where the clearance space between body 6 and bore 5a is one thirty-second of an inch.

It will be understood that instead of using a single packing ring in each groove, I may use multiple rings, staggering their respective splits 17 to reduce the possibility of fluid leaking past the rings. Instead of being split on a bias, the rings may be made with tongue and groove joints or with any other type of joint commonly used for such purpose.

It will also be understood that the lower end of body 6, which is shown in the drawing to be an internally threaded collar, may instead be of any other desired form for attachment thereto of a conventional valve cage or other pumping attachment.

What I claim and desire to secure by Letters Patent is:

1. In a pump of the character described, a barrel, a pump plunger arranged in the barrel and comprising a cylindrical body, rings rigidly united with said body and extending laterally therefrom, said rings being spaced apart and forming intervening grooves substantially rectangular in cross section, and packing rings mounted in said grooves and engaging said barrel, said packing rings being normally of a size and shape to substantially fill said grooves and characterized by their ability to swell a predetermined amount.

2. In a pump of the character described, a barrel, a pump plunger arranged in the barrel and having a plurality of ring grooves formed therein, the said grooves being separated from each other by lands integral with the body portion of said plunger, each of said grooves being substantially rectangular in cross section, and packing rings mounted in said grooves and engaging said barrel, said packing rings being normally of a size and shape to substantially fill said grooves and characterized by their ability to swell a predetermined amount.

3. In a pump of the character described, a barrel member, a pump plunger member arranged in said barrel member and having a plurality of ring grooves formed therein, one of the members being adapted to reciprocate relatively to the other member, the said grooves being separated from each other by lands rigidly united with the body portion of said plunger member, said lands projecting into close proximity to the inner surface of the barrel member and each land having substantially parallel upper and lower surfaces which extend to the periphery of the body, and composition packing rings mounted in said grooves and engaging the inner surface of the barrel, said packing rings being normally of a size and shape to substantially fill said grooves and characterized by their ability to swell a predetermined amount to snugly engage the inner surface of the barrel member, opposed surfaces of the lands being provided with means to interlock with the packing rings to hold them firmly in place.

JOHN N. MARTIN.